US007839391B2

(12) United States Patent
Varian et al.

(10) Patent No.: US 7,839,391 B2
(45) Date of Patent: Nov. 23, 2010

(54) SEGMENTED TOUCH SCREEN CONSOLE WITH MODULE DOCKING

(75) Inventors: Dennis William Varian, Madison, WI (US); Zhaodong Max Li, Madison, WI (US); John J. Hanesworth, Madison, WI (US); Fred R. Foster, Verona, WI (US); Jason Frederick Penn, Madison, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 898 days.

(21) Appl. No.: 11/267,089

(22) Filed: Nov. 4, 2005

(65) Prior Publication Data

US 2007/0103447 A1    May 10, 2007

(51) Int. Cl.
G09G 5/00    (2006.01)
(52) U.S. Cl. ................ 345/173; 345/168; 345/184
(58) Field of Classification Search ........ 345/156–184; 341/22–34
See application file for complete search history.

(56) References Cited

U.S. PATENT DOCUMENTS

| 3,757,322 | A | | 9/1973 | Barkan et al. | |
|---|---|---|---|---|---|
| 5,300,943 | A | | 4/1994 | Jakobs et al. | |
| 5,572,239 | A | * | 11/1996 | Jaeger | 345/172 |
| 5,646,649 | A | * | 7/1997 | Iwata et al. | 345/173 |
| 5,815,141 | A | | 9/1998 | Phares | |
| 5,818,361 | A | | 10/1998 | Acevedo | |
| 5,818,924 | A | * | 10/1998 | King et al. | |
| 5,859,631 | A | | 1/1999 | Bergman et al. | |
| 5,900,599 | A | | 5/1999 | Ohashi et al. | |
| 5,956,025 | A | * | 9/1999 | Goulden et al. | 345/169 |
| 6,028,591 | A | | 2/2000 | Lueders | |
| 6,118,433 | A | * | 9/2000 | Jenkin et al. | 345/173 |
| 6,492,978 | B1 | | 12/2002 | Selig et al. | |
| 6,697,251 | B1 | | 2/2004 | Aisenberg | |
| 7,388,578 | B2 | * | 6/2008 | Tao | 345/173 |
| 2003/0048257 | A1 | * | 3/2003 | Mattila | 345/169 |
| 2004/0061685 | A1 | * | 4/2004 | Ostergard et al. | 345/169 |
| 2006/0033720 | A1 | * | 2/2006 | Robbins et al. | 345/173 |
| 2006/0061558 | A1 | * | 3/2006 | Grant et al. | 345/184 |

OTHER PUBLICATIONS

Studer Vista 8 Catalogue; Digital live production console; 13 pages; Date unknown, prior to present invention.
Dahlin, "Reach Out and Touch: Designing a Resistive Touch Screen"; Circuit Cellar, Jan. 2000.

* cited by examiner

*Primary Examiner*—Regina Liang
(74) *Attorney, Agent, or Firm*—Michael Best & Friedrich LLP (57) ABSTRACT

A segmented touch screen overlies the display or displays of a console having an operating system and display controller for the display. A touch screen controller is continuously connected to each of the touch screen segments and separate touch position information is obtained for each touch screen segment. The console operating system can be supplied with separate position information for each segment or with a single touch position for combined segments. A number of docking module ports near the display optionally receive docking modules that cover segments of the touch screen and display. A module, including tactile elements such as push button switches, can be docked at any port. When a module is detected, the touch screen segment under the module is disabled and the display under the module is switched to display module specific information.

28 Claims, 10 Drawing Sheets

| 1.BLIND CHANNEL | 3.PATCH | | | | | | | |
|---|---|---|---|---|---|---|---|---|
| STATUS | CHANNEL | LABEL | DEVICE TYPE | ERROR | GATEWAY | PORT | ADDRESS | ACN CID |
| ONLINE | 1 | | GEN-DIMMER | | DMX4 337CC948-D0 | 1 | 1 | 337CC948-D075-4A46-A5D8-A28CBEB |
| ONLINE | 2 | | GEN-DIMMER | | DMX4 337CC948-D0 | 1 | 2 | 337CC948-D075-4A46-A5D8-A28CBEB |
| ONLINE | 3 | | GEN-DIMMER | | DMX4 337CC948-D0 | 1 | 3 | 337CC948-D075-4A46-A5D8-A28CBEB |
| ONLINE | 4 | | GEN-DIMMER | | DMX4 337CC948-D0 | 1 | 4 | 337CC948-D075-4A46-A5D8-A28CBEB |
| ONLINE | 5 | | GEN-DIMMER | | DMX4 337CC948-D0 | 1 | 5 | 337CC948-D075-4A46-A5D8-A28CBEB |
| ONLINE | 6 | | GEN-DIMMER | | DMX4 337CC948-D0 | 1 | 6 | 337CC948-D075-4A46-A5D8-A28CBEB |
| ONLINE | 7 | | GEN-DIMMER | | DMX4 337CC948-D0 | 1 | 7 | 337CC948-D075-4A46-A5D8-A28CBEB |
| ONLINE | 8 | | GEN-DIMMER | | DMX4 337CC948-D0 | 1 | 8 | 337CC948-D075-4A46-A5D8-A28CBEB |
| ONLINE | 9 | | GEN-DIMMER | | DMX4 337CC948-D0 | 1 | 9 | 337CC948-D075-4A46-A5D8-A28CBEB |
| ONLINE | 10 | | GEN-DIMMER | | DMX4 337CC948-D0 | 1 | 10 | 337CC948-D075-4A46-A5D8-A28CBEB |
| ONLINE | 11 | | GEN-DIMMER | | DMX4 337CC948-D0 | 1 | 11 | 337CC948-D075-4A46-A5D8-A28CBEB |
| ONLINE | 12 | | GEN-DIMMER | | DMX4 337CC948-D0 | 1 | 12 | 337CC948-D075-4A46-A5D8-A28CBEB |
| ONLINE | 13 | | GEN-DIMMER | | DMX4 337CC948-D0 | 1 | 13 | 337CC948-D075-4A46-A5D8-A28CBEB |
| ONLINE | 14 | | GEN-DIMMER | | DMX4 337CC948-D0 | 1 | 14 | 337CC948-D075-4A46-A5D8-A28CBEB |
| ONLINE | 15 | | GEN-DIMMER | | DMX4 337CC948-D0 | 1 | 15 | 337CC948-D075-4A46-A5D8-A28CBEB |
| ONLINE | 16 | | GEN-DIMMER | | DMX4 337CC948-D0 | 1 | 16 | 337CC948-D075-4A46-A5D8-A28CBEB |
| ONLINE | 17 | | GEN-DIMMER | | DMX4 337CC948-D0 | 1 | 17 | 337CC948-D075-4A46-A5D8-A28CBEB |
| ONLINE | 18 | | GEN-DIMMER | | DMX4 337CC948-D0 | 1 | 18 | 337CC948-D075-4A46-A5D8-A28CBEB |
| ONLINE | 19 | | GEN-DIMMER | | DMX4 337CC948-D0 | 1 | 19 | 337CC948-D075-4A46-A5D8-A28CBEB |
| ONLINE | 20 | | GEN-DIMMER | | DMX4 337CC948-D0 | 1 | 20 | 337CC948-D075-4A46-A5D8-A28CBEB |
| ONLINE | 21 | | GEN-DIMMER | | DMX4 337CC948-D0 | 1 | 21 | 337CC948-D075-4A46-A5D8-A28CBEB |
| ONLINE | 22 | | GEN-DIMMER | | DMX4 337CC948-D0 | 1 | 22 | 337CC948-D075-4A46-A5D8-A28CBEB |
| ONLINE | 23 | | GEN-DIMMER | | DMX4 337CC948-D0 | 1 | 23 | 337CC948-D075-4A46-A5D8-A28CBEB |
| ONLINE | 24 | | GEN-DIMMER | | DMX4 337CC948-D0 | 1 | 24 | 337CC948-D075-4A46-A5D8-A28CBEB |
| ONLINE | 25 | | GEN-DIMMER | | DMX4 337CC948-D0 | 1 | 25 | 337CC948-D075-4A46-A5D8-A28CBEB |
| ONLINE | 26 | | GEN-DIMMER | | DMX4 337CC948-D0 | 1 | 26 | 337CC948-D075-4A46-A5D8-A28CBEB |
| ONLINE | 27 | | GEN-DIMMER | | DMX4 337CC948-D0 | 1 | 27 | 337CC948-D075-4A46-A5D8-A28CBEB |
| ONLINE | 28 | | GEN-DIMMER | | DMX4 337CC948-D0 | 1 | 28 | 337CC948-D075-4A46-A5D8-A28CBEB |
| ONLINE | 29 | | GEN-DIMMER | | DMX4 337CC948-D0 | 1 | 29 | 337CC948-D075-4A46-A5D8-A28CBEB |
| ONLINE | 30 | | GEN-DIMMER | | DMX4 337CC948-D0 | 1 | 30 | 337CC948-D075-4A46-A5D8-A28CBEB |
| ONLINE | 31 | | GEN-DIMMER | | DMX4 337CC948-D0 | 1 | 31 | 337CC948-D075-4A46-A5D8-A28CBEB |
| ONLINE | 32 | | GEN-DIMMER | | DMX4 337CC948-D0 | 1 | 32 | 337CC948-D075-4A46-A5D8-A28CBEB |
| ONLINE | 33 | | GEN-DIMMER | | DMX4 337CC948-D0 | 1 | 33 | 337CC948-D075-4A46-A5D8-A28CBEB |
| ONLINE | 34 | | GEN-DIMMER | | DMX4 337CC948-D0 | 1 | 34 | 337CC948-D075-4A46-A5D8-A28CBEB |
| ONLINE | 35 | | GEN-DIMMER | | DMX4 337CC948-D0 | 1 | 35 | 337CC948-D075-4A46-A5D8-A28CBEB |

SEGMENTED TOUCH SCREEN CONSOLE WITH MODULE DOCKING

FIELD OF THE INVENTION

The present invention relates to improvements in control consoles.

DESCRIPTION OF THE PRIOR ART

Known control consoles include general purpose consoles such as personal computers with keyboards, processors, memory and displays, and also include special purpose consoles such as lighting control consoles, process control consoles and others. A conventional console may include user input devices such as keyboards, pointing devices, rotary and linear encoders and others. A conventional console may include one or more displays such as CRT or LCD or plasma displays. A conventional console may include a user input touch screen over one or each different display. Known consoles also typically include an operating system with a processor and memory, along with stand alone or integrated controllers for the display and touch screen.

As the systems controlled by consoles become more complex, the consoles also become more complex, with a requirement for a large number of user inputs such as keyboard keys, encoders of various types and the need to display a large quantity of information. The physical size of dedicated, special purpose consoles such as lighting control consoles is increasing to provide of all the desired functionality. Complexity and large size are disadvantageous in control consoles. It would be desirable to increase the flexibility and customization potential of control consoles, and to optionally provide tactile feel for user input that is not possible with touch screen input.

SUMMARY OF THE INVENTION

A primary object of the present invention is to provide improvements in control consoles. Other objects are to provide a console having segmented display and touch screen capability; to provide a console touch screen capable of producing touch position information at more than one location simultaneously; to provide a console touch screen with segments that can be individually disabled; to provide an improved console that can optionally accept docking user input modules at selected locations; to provide an improved console with automatic docking module detection; to provide a console with display and touch screen segments that can be controlled when a docking module is docked at a docking port to tailor a portion of the display for the module and to disable a touch screen segment under the module; and to provide an improved control console overcoming disadvantages of consoles known in the past.

In brief, in accordance with the present invention, there is provided a control console including a display and a plurality of module docking ports adjacent the display. A plurality of touch screen segments are on the display. A docking module is receivable at any one of the module docking ports. A module detector is located at each docking ports. A touch screen controller disables one of the touch screen segments in response to a module detection signal from any of the module detectors.

In brief, also according to the invention there is provided a console including an operating system, display controller and display for displaying information. A touch screen assembly overlies the display. The touch screen assembly includes a plurality of touch screen segments. A touch screen controller is continuously connected to each of the segments. The touch screen controller independently receives touch position information from each of the touch screen segments.

BRIEF DESCRIPTION OF THE DRAWING

The present invention together with the above and other objects and advantages may best be understood from the following detailed description of the preferred embodiment of the invention illustrated in the drawings, wherein:

FIG. 12 is an enlarged plan view of a display of the console 20 with no module in place on the display;

DETAILED DESCRIPTION OF THE PREFERRED EMBODIMENT

Figure 1:
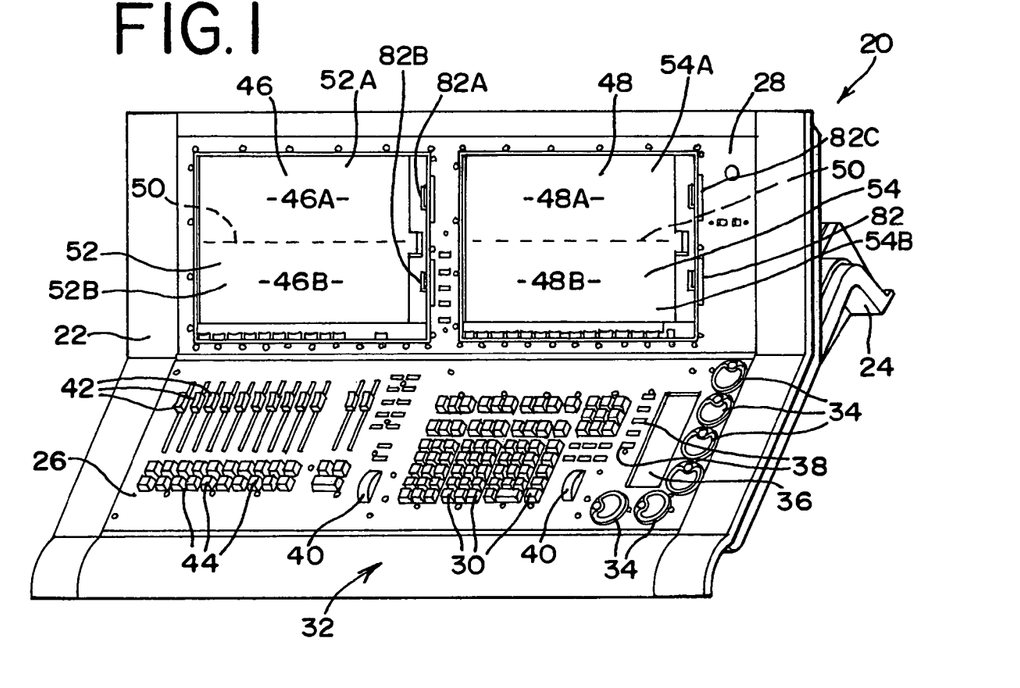
FIG. 1 is an isometric view of a console constructed in accordance with the present invention.

Having reference now to the drawing, and initially to FIG. 1, there is illustrated a console generally designated as 20 and constructed in accordance with the principles of the present invention. The console 20 has a housing 22 including a base 24, a keyboard panel portion 26 and a display panel portion 28. The console 20 may be a lighting control console, but the principles of the invention are not limited to this application.

The keyboard panel 26 supports a number of devices that can be employed by a user for manual input of commands including data and the like. A user inputs commands using buttons 30 of a keyboard 32 on the keyboard panel 26. Commands may also be input using a bank of rotary input devices or encoder wheels 34. A small display screen 36 displays legends for the wheels 34, and buttons 38 accept commands to control the display 36 and functions of wheels 34. Commands may also be entered with an additional pair of encoder wheels 40. Commands may also be entered using a bank of linear input devices or submaster faders 42 having functions controlled by buttons 44.

The display panel 26 supports a pair of displays 46 and 48. These may be similar to one another, and each may be a fifteen inch diagonal flat panel liquid crystal display (LCD), although the principles of the invention are applicable to displays of other sizes and types. Displays 46 and 48 are functionally divided into upper segments 46A and 48A and lower segments 46B and 48B, separated by a line of potential division or separation that is not visible on the displays 46 and 48 but is indicated in the drawings by broken line 50.

Some or all of the display segments 46A, 46B, 48A and 48B may be operated as a single unitary display group so that a continuous display is seen on the group. Thus segments 46A and 46B for example can display a single continuous graphic display. Each of the display segments 46A, 46B, 48A and 48B may also be operated separately on a functionally stand alone basis so that a separate, independent graphic display is seen on any one selected display segment.

Figure 5:
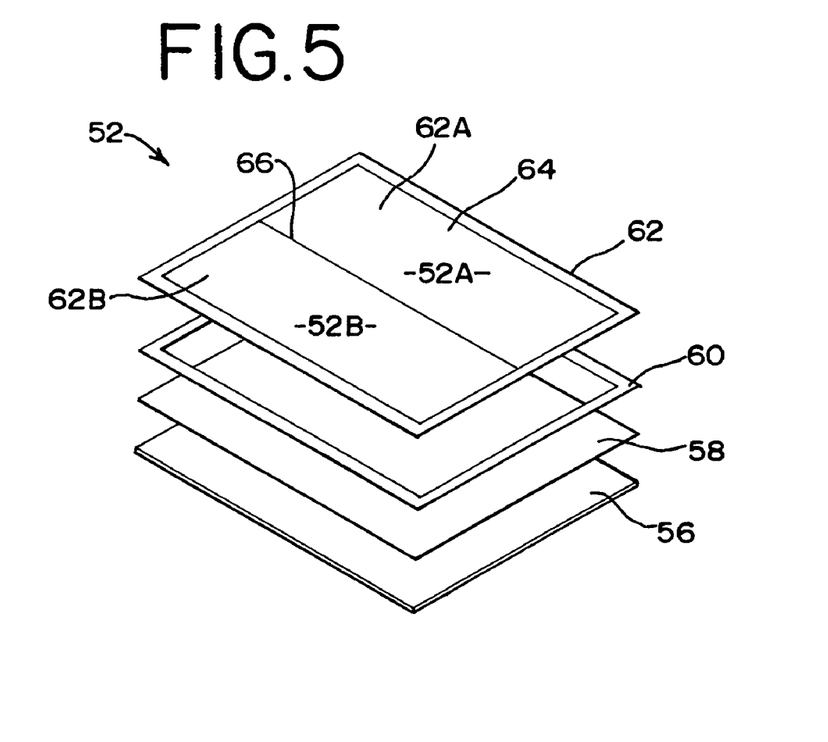
FIG. 5 is an exploded isometric view of one of the touch screen assemblies of the console.

In addition to entering commands using the devices associated with the keyboard panel 26, the user may also enter commands with touch screen assemblies 52 and 54 overlying the displays 46 and 48. The structures of the two touch screens 52 and 54 may be identical. Although the invention can be applied to any type of touch screen, the illustrated console 20 uses resistive touch screens. As seen in FIG. 5, touch screen 52 is representative of both touch screens 52 and 54 and includes a transparent support backing plate 56 to which is adhered a bottom electrical layer 58. A spacer layer 60 separates the bottom electrical layer 58 from a flexible top electrical layer 62 having a flexible protective hard coat top surface 64.

All of the layers 56, 58, 60, 62 and 64, as well as adhesives joining them together, are transparent so that the display 46 is visible through the touch screen 52. Spacer layer 60 includes an array of spacer elements such as dots that normally separate the bottom and top electrical layers 58 and 60. Touch of a user's finger or a stylus or the like results in electrical contact between layers 58 and 60 at the point of contact. The position of this contact in x and y coordinates is sensed. The display 46 or 48 underlying the touch screen 52 or 54 provides a graphic display that is coordinated with the touch screen to facilitate user comprehension and input.

The touch screens 52 and 54 are segmented and may cooperate with the functional segments 46A and 46B of the display 46 and with the functional segments 48A and 48B of the display 48. The touch screen 52 includes upper and lower segments 52A and 52B, and the touch screen 54 includes upper and lower segments 54A and 54B. These segments overlie and are coextensive with the display segments 46A, 46B, 48A and 48B.

Referring again to FIG. 5, the bottom electrical layer 58 and the spacer layer 60 are common to the touch screen segments 52A and 528, and may extend generally throughout the entire area of touch screen 52. The top electrical layer 62 is divided into two separate segments 62A and 62B separated by a gap 66. Each of the segments 62A and 62B is connected to a touch screen controller 68 and can be operated independently of the other. Individual segments of the touch screen 54 have the same structure and are also connected to the controller 68 in the same way.

Figure 6:
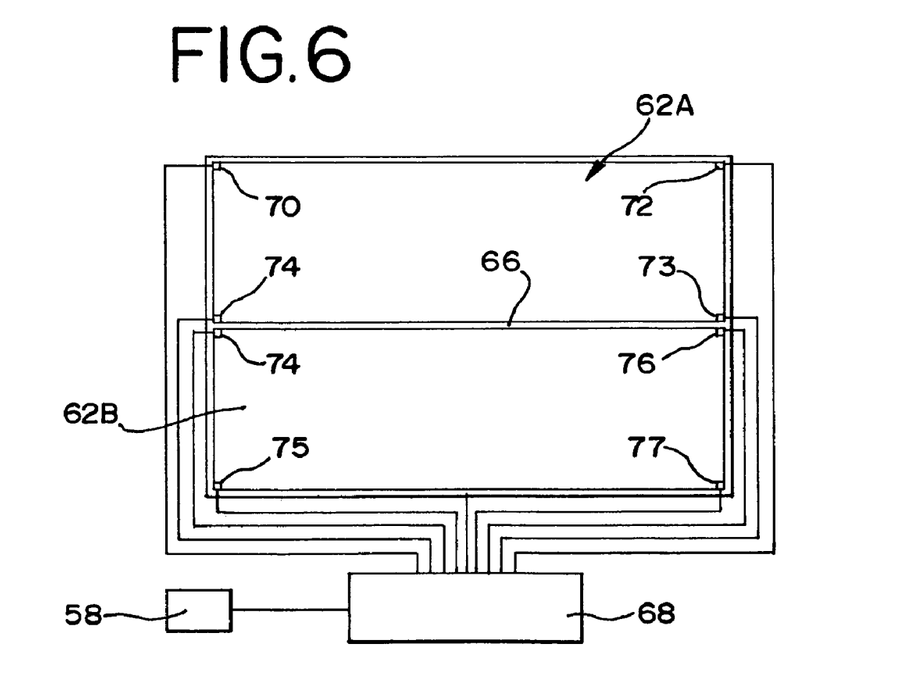
FIG. 6 is a top plan view of the top electrical layer of one of the touch screen assemblies, with the touch screen controller and touch screen electrical connections show schematically.

The top electrical layer 62 of one of the two similar touch screens 52 and 54 is seen in plan view in FIG. 6. The touch screen segments 62A and 62 B are separated by the gap 66. The gap 66 is preferably very narrow, for example 0.010 inch or less. The touch screen controller 68 illustrated schematically in FIG. 6 may be implemented in the microprocessor based operating system of the console 20 or may be a separate device. The controller includes memory and a processor and 68 is connected to the four corners 70, 71, 72 and 73 of the top screen segment 62A and to the four corners 74, 75, 76 and 77 of the bottom screen segment 62B. The controller 68 is also connected to the common bottom electrical layer 58. The controller 68 is connected in the same way to the elements of the touch screen 54.

For touch screen operation of the top segment 62A, the controller 68 applies an alternating series of voltage differentials in transverse x and y directions across the corners 70, 71, 72 and 73. When the screen is touched at an x-y position, contact is made between the top electrical layer segment 62A and the common bottom electrical layer 58. The layer 58 is used as an x-y position pick up or sensor. To read the x position, the controller 68 applies a voltage to corners 70 and 71 and applies ground potential to corners 72 and 73. The voltage applied to layer 58 corresponds to the x position. To read the y position, the controller 68 applies a voltage to corners 70 and 72 and applies ground potential to corners 71 and 73. The voltage applied to layer 58 corresponds to the x position.

The operation of each of the other touch screen segments 52B, 54A and 54B is similar. In order to obtain x-y position information independently from adjacent segments such as segments 62A and 62B, The corner voltage applications are sequenced, for example in a repeating sequence of: (1) 70 and 71 voltage-72 and 73 ground, (2) 70 and 72 voltage-71 and 73 ground, (3) 74 and 75 voltage-76 and 77 ground and (4) 74 and 76 voltage-75 and 77 ground. The voltage at the pick up layer 58 is sensed and interpreted in synchronism with this sequence.

Corners 71 and 74 may be commoned and corners 73 and 76 may be commoned because segments 62A and 62B are not energized simultaneously. This permits the use of only seven conductors for operation of both segments of the touch screen 62. Further information about the construction and operation of resistive touch screens, beyond that helpful for an understanding of the invention, may be found in Dahlin, "Reach Out/and Touch: Designing a Resistive Touch Screen", CIRCUIT CELLULAR, January, 2000, incorporated herein by reference.

The segmented touch screen has advantages. A conventional touch screen can supply only a single x-y position. If a touch screen is touched in more than one place, spurious inputs are sensed and it is not possible to obtain a useful touch position input. With a typical touch screen covering the entire area of an underlying display, only a single touch point command can be obtained. With a segmented touch screen in accordance with this invention, a separate touch position input can be obtained for each segment. Thus, for the touch screen of FIGS. 5 and 6, two separate and simultaneous inputs can be obtained and stored in memory in the controller 68.

The segmented touch screen 52 or 54 can alternatively be operated as a single, continuous touch screen. The gap 66 is narrow enough that it is bridged by finger or stylus contact without any discontinuity. If the touch screen is operating as one screen, the user is not aware of the gap between segments. The sensed x-y position information developed in the controller 68 is typically provided to the console operating system for generation and execution of system commands. In the segmented system, the controller 68 can continuously provide x-y position information for each segment 62A and 62B, as well as x-y position information for the entire touch screen area. The operating system then has great flexibility in controlling the mode of touch screen operation.

Figure 15:
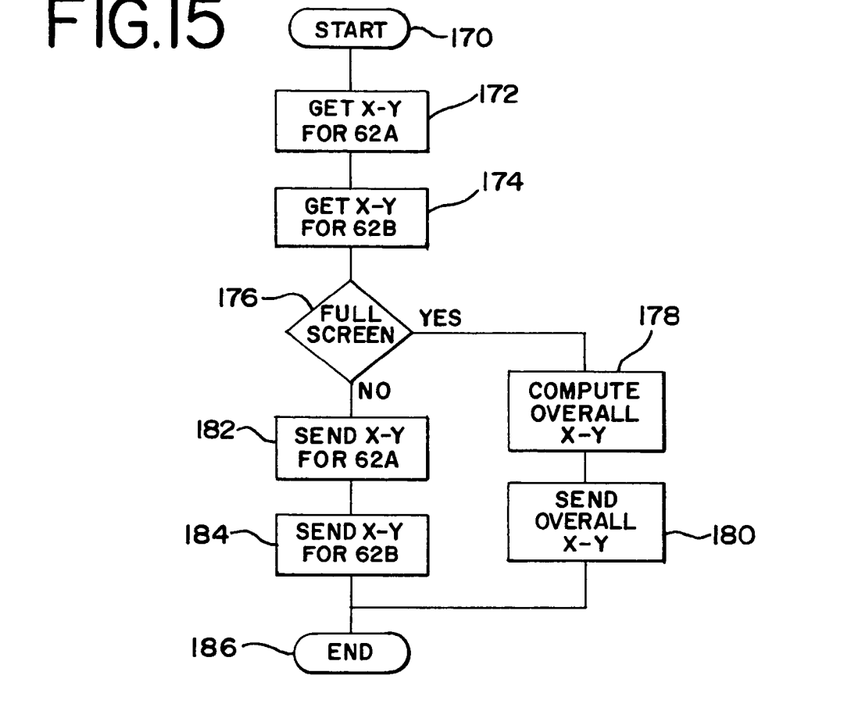
FIG. 15 is a flow chart of a routine for providing touch screen position information.

FIG. 15 is a flow chart of a simplification of a routine used by the controller 68 in providing position information to the operating system of the console 20. The routine starts in block 170. In blocks 172 and 174 respectively, the x-y positions for touch screen segments 62A and 62B are obtained and stored. The operating system of the console 20 under direct or indirect user or software control requests that the touch screen segments 62A or 62B operate independently or, alternatively, operate together as a continuous full screen touch screen. In block 176 a determination is made whether or not full screen operation is requested by the operating system.

If full screen touch screen operation is requested at block 176, then in block 178 the position information stored at blocks 172 and 174 may be used to find a single x-y position for the overall touch screen. This computation includes finding a single touch position in block 172 or in block 174. At block 180 this overall position information is sent to the console operating system. If segmented touch screen operation (not full screen) is requested at block 176, then the separate and independent x-y position information for touch screen segments 62A ands 62B is sent to the operating system at blocks 182 and 184. This routine ends at block 186. Touch screen information from the touch screen 54 is provided in the same way.

Another advantage of the segmented touch screen is that it is not necessary to continuously implement the touch screen operation over the full extent of the display and touch screen area. A conventional touch screen is either operating or not operating over its entire area. With the segmented touch screen, it is possible to disable or interrupt or redirect the output of any one or more segments of the touch screen area, while continuing to operate any other segment or segments.

Figure 2:
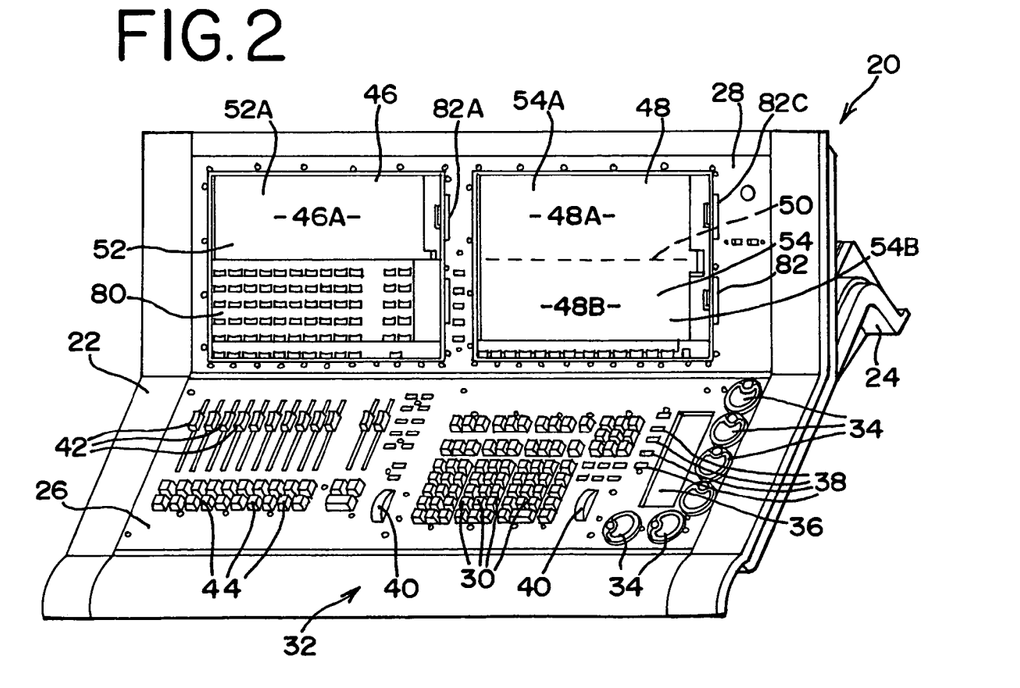
FIG. 2 is a view like FIG. 1 with a docking module in place.
Figure 3:
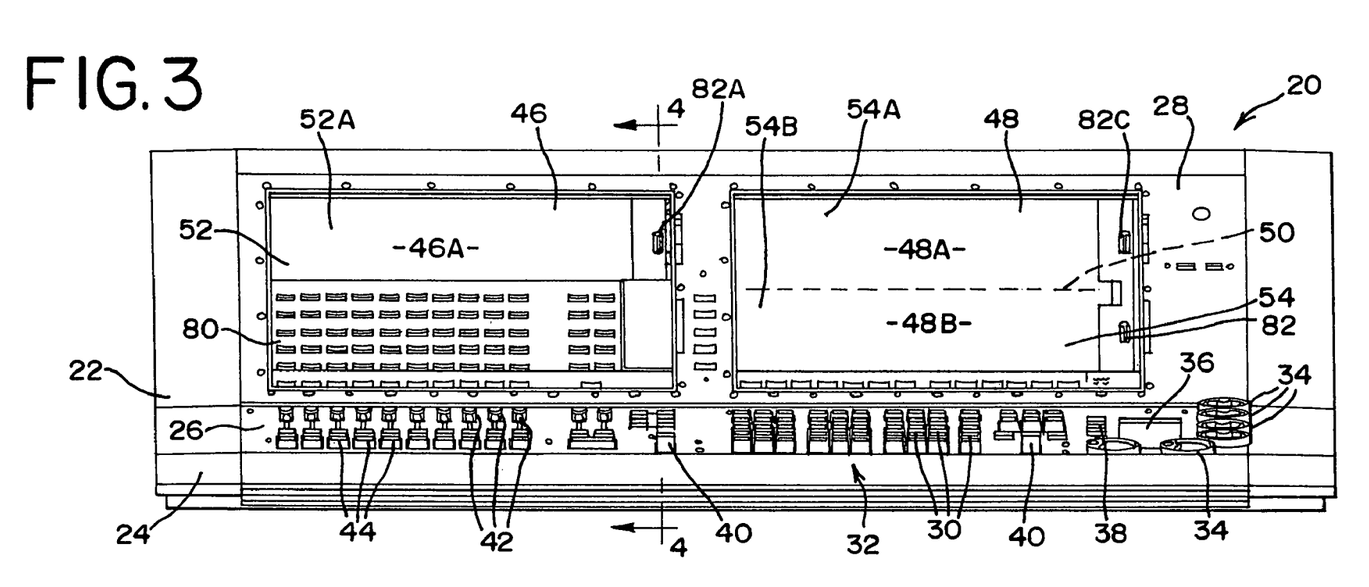
FIG. 3 is an enlarged front view of the console and module of FIG. 2.
Figure 4:
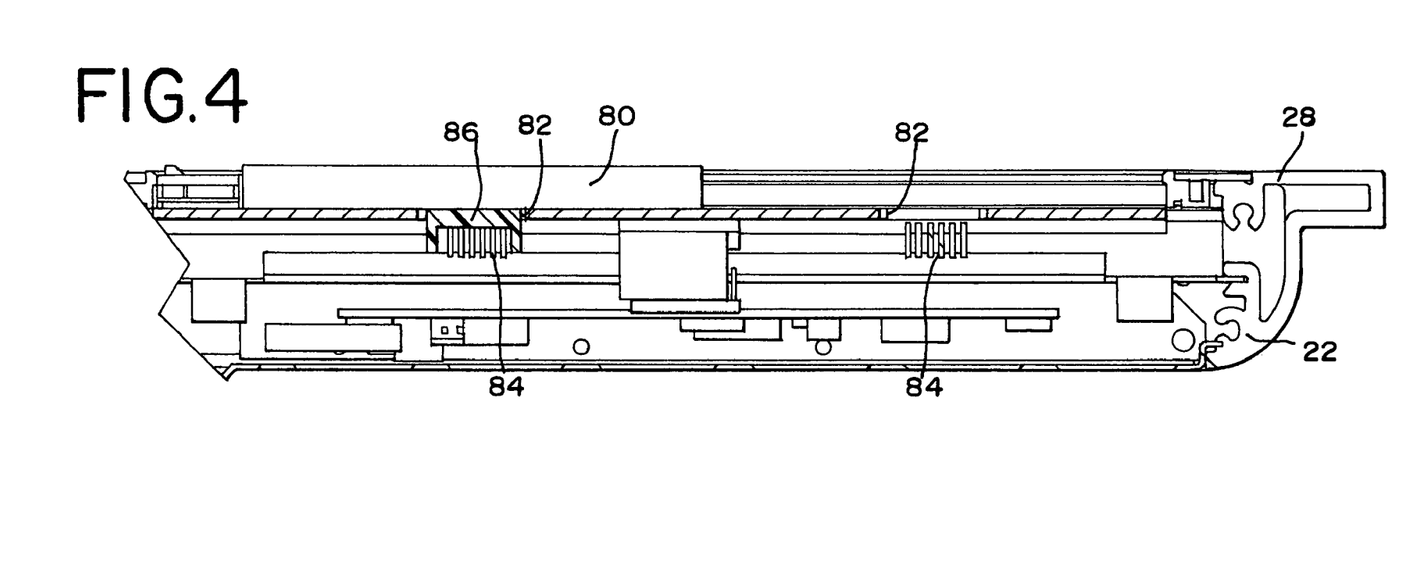
FIG. 4 is a fragmentary, enlarged, cross sectional view taken along the line 4-4 of FIG. 3.

The console 20 accepts one or more docking modules such as the button switch module 80 seen in FIGS. 2-4. Each of the display areas 46A, 46B, 48A and 48B, with their associated touch screen segments 52A, 52B, 54A and 54B can be configured to serve as a docking location for a module such as the module 80. In the illustrated arrangement, a module such as the module 80 can be docked on any of display areas 46A, 46B and 48A. Module 80 is seen docked on display area 46A in FIGS. 2-4. More than one docking module 80, up to three, may be docked on the display areas 46A, 46B and 48A. The modules may be similar to one another or may be different in configuration and capability.

Located to the side of each display area 46A, 46B and 48A is a docking port 82A, 82B and 82C. Each docking port 82 includes a multipin electrical port connector 84. The module 80 includes a mating card edge module connector 86. When the module 80 is docked in position over a display area, its module connector 86 mates with the corresponding port connector 84 as seen in FIG. 4.

The module 80 is at least partly transparent so that the user can view the corresponding display through the module. In FIG. 2 for example, the display portion 46B is viewed through the module 80. Therefore, when the module 80 is in place, the underlying display portion 46B can be used to convey information tailored specifically to the module 80.

Figures 7, 8:
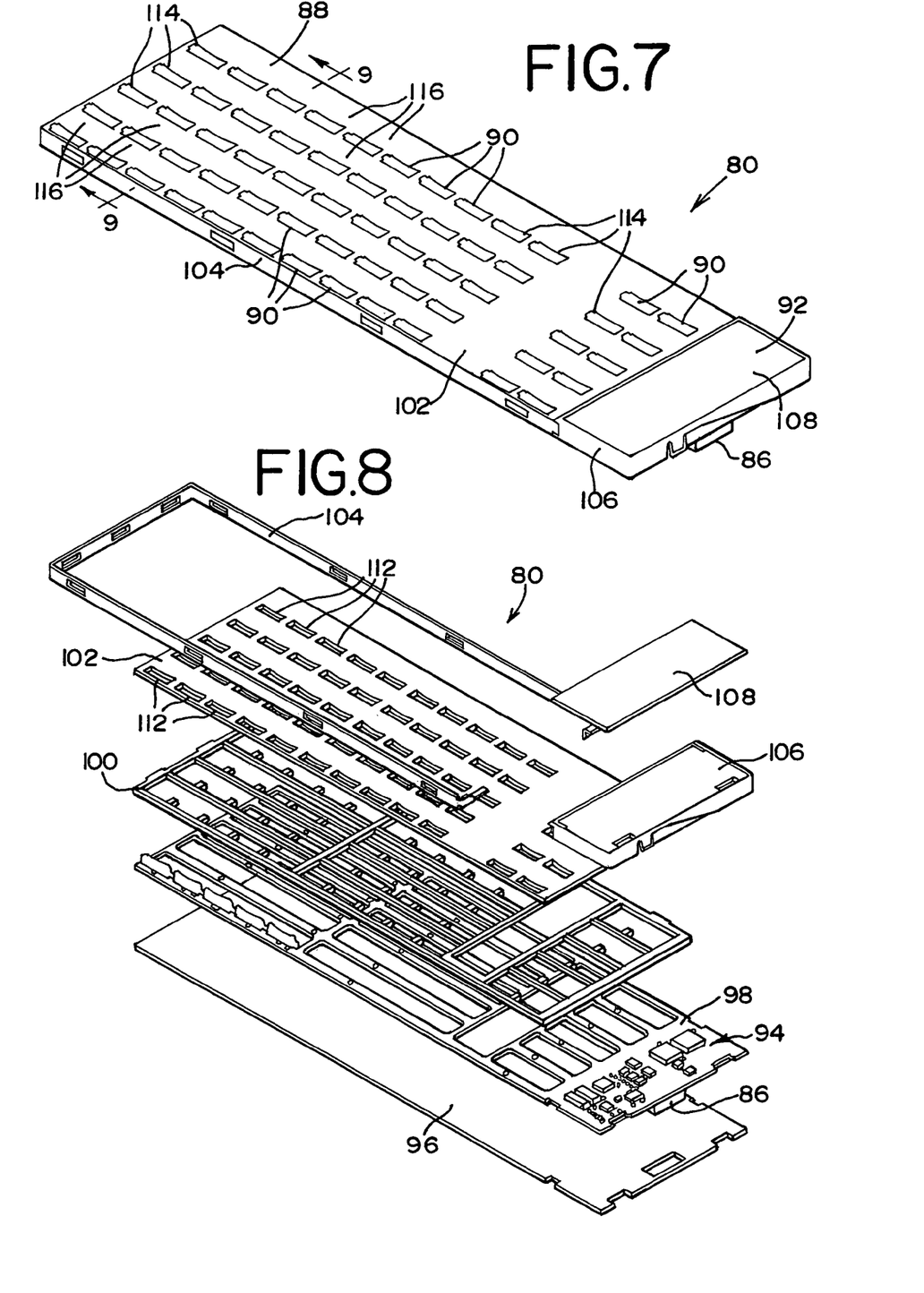
FIG. 7 is an enlarged isometric view of a docking module for the console.
FIG. 8 is an exploded isometric view of the module of FIG. 7.
Figure 9:
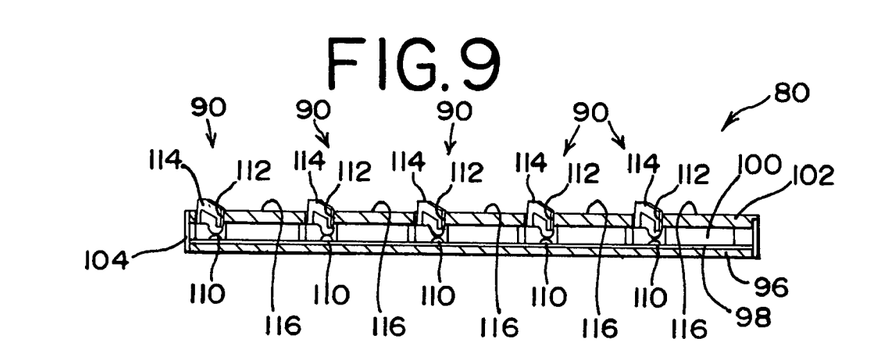
FIG. 9 is an enlarged cross sectional view of the module taken along the line 9-9 of FIG. 7.

The structure of the module 80 is best seen in FIGS. 7-9. Although module 80 is a button switch module, the principles of the invention are applicable to modules of other types and configurations. Module 80 includes a largely transparent keypad portion 88 with an array of push button switches 90 and a head portion 92 enclosing circuit components 94. The card edge module connector 86 is mounted at the bottom of the head portion 92. As seen in FIG. 8, a transparent carrier tray 96 supports a printed circuit board 98 having numerous apertures in the region of the keypad portion 88 through which an underlying display can be viewed, A spacer grid 100 separates the printed circuit board 98 from a transparent clear lens layer 102. A mounting frame 104 surrounds the edges of the keypad portion 88 of the module 80. The components 94 are enclosed by a cover 106, and a panel 108 containing graphic information may overlie the cover 106.

As seen in FIG. 9, each pushbutton switch 90 includes a dome switch 110 mounted on the circuit board 98. The dome switches 110 are conventional normally open momentary operating switches that are operated to the closed condition by a downward force applied to the dome. Circuit traces on the circuit board 98 extend to all of the dome switches and the circuitry 94 supplies switch operation data through the connectors 86 and 84 to the operating system of the console 20. Simultaneous switch operations are enabled.

The lens layer 102 includes an aperture 112 for each switch 90, aligned with the corresponding dome switch 110. A key cap 114 is captured for vertical movement in each aperture 112 above the corresponding dome switch 110. The dome switch 110 biases the key cap 114 to an upper position. When the user presses down on a key cap 114, or plurality of key caps 114, the corresponding dome switch or switches 110 is or are closed.

There are advantages in using the module 80 for user input in place of the touch screen input of the display. One advantage is that multiple switches 90 can be operated simultaneously. Another advantage is that the user can find the key caps 114 by feel. Another advantage is that key switch motion and reaction force from the dome switches provides the user with tactile switch operation feed back. For these reasons, the module 80 may be preferred to touch screen input, particularly in applications where the user may not wish to look continuously at the display.

Above each push button switch 90 is a legend area 116 of the lens layer 102. Apertures in the circuit board 98 and the spacer grid 100 provide an unobstructed light path between the underlying display 46B (FIG. 2) and each of the legend areas 116. The display 46B is operated to provide any desired legends in the areas 116, one for each push button switch 90. The module may be used for any of a variety of functions, and the legends displayed at the areas 116 can be programmed and selected accordingly.

Figure 10:
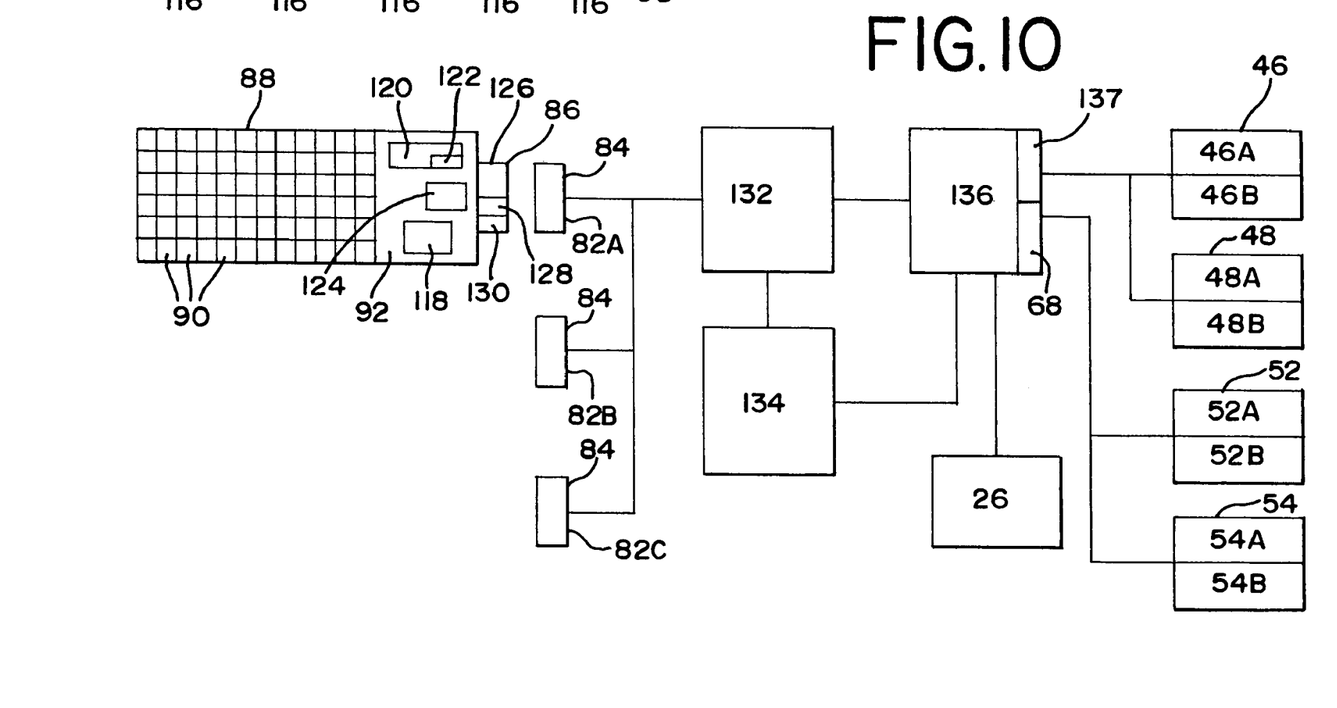
FIG. 10 is a simplified schematic block diagram of some components of the console and module.

Referring now to the simplified schematic block diagram of FIG. 10, the circuitry 94 of the module 80 includes a microprocessor 118 for reading and processing user commands entered using the push button switches 90, and associated memory 120 including a non volatile memory region 122 for storage of module identity and similar information. An interface processor, for example a universal serial bus (USB) chip 124, enables communication through a bus terminal section 126 of the connector 86. The connector 86 includes another locator section 128. The terminals in locator section 128 are flagged by selective jumpering to ground or by bridging or the like so that when the module 80 is connected to one of the docking ports 82, the position of the module is uniquely established.

A feature of the console 20 is that when a module 80 is docked at one of the docking ports 82A, 82B or 82C, the touch screen segment under the module is disabled. This prevents spurious touch screen signals resulting from contact by the module. For example, in FIG. 2, with module 80 in place over the display area 46B, the touch screen section 52B is disabled. The connector 86 includes a module detector or disable section 130, and when contact is made between a docking port connector 84 and the disable section 130, the presence of the module is detected and the adjacent touch screen section can be disabled.

When a module 80 is docked at a port 82A, 82B or 82C, a bus connection is established between the module 80 and a device manager 132. The device manager 132 accesses the identity information in non volatile memory 122, and enters pertinent information relating to the module in a table in shared memory 134. The position of the module can also be maintained in memory. The shared memory and pertinent information about the module is available to the microprocessor based operating system 136 of the console 20. The operating system 136 receives commands from the devices of the keyboard panel 26 and from the touch screens 46 and 48. The operating system is able to disable any of the touch screen sections 46A, 46B, 48A and 48B. The operating system 136 employs a display controller 137 to control the information displayed on displays 52 and 54 and is able to use display segments 52A and 52B and display segments 54A and 54B either as a single display space or as separate display spaces. Display controller 137 may be implemented in the operating system 136 or may be entirely or in part a separate device.

Figure 11:
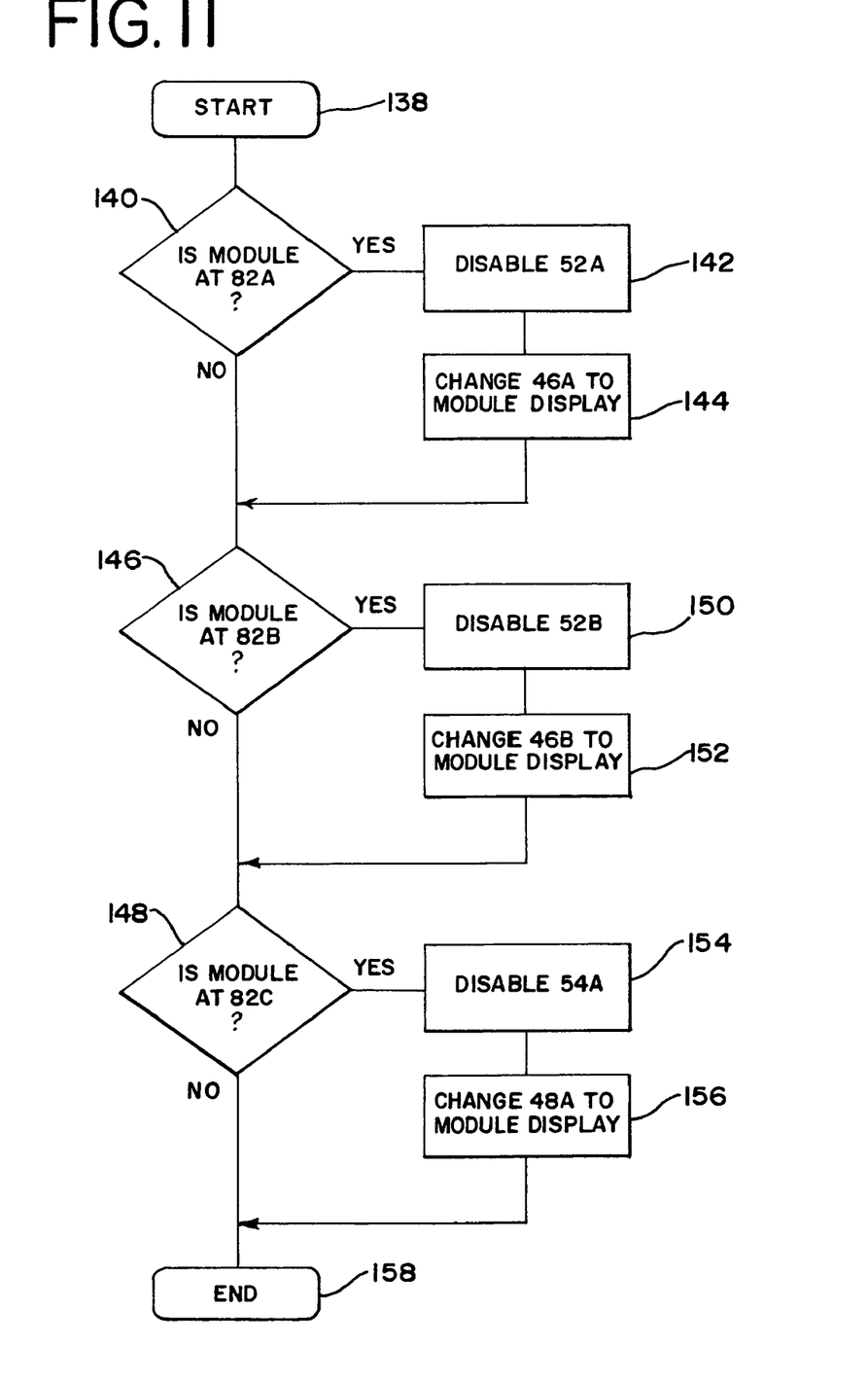
FIG. 11 is a flow chart of a routine for disabling any touch screen segment that is beneath a module.

When a module is docked at any one or more of the docking ports 82A, 82B or 82C, the corresponding touch screen segment or segments 52A, 52B or 54A is or are disabled and the corresponding display segment or segments 46A, 46B or 48A is or are switched to a display mode corresponding and tailored to the module. FIG. 11 is a flow chart of a simplification of a routine for modifying the console 20 in response to docking of a module 80. The routine starts at block 138 and at block 140 it is determined whether or not a module is present at dock 82A. The operating system can make this determination by accessing table information in shared memory 134 or by interrogating the disable section 130 or the locator section 128.

If a module is present at port 82A, the touch screen segment 52A is disabled at block 142. The touch screen segment may be disabled by discontinuing energization of the segment or by interrupting or redirecting the touch screen output from the touch screen controller 68. At block 144, the display section 46A is appropriated and operated in a module display mode for providing legends for push button switches 90 at legend areas 116. In a similar manner, ports 82B and 82C are interrogated at blocks 146 and 148. If a module is present at port 82B, then touch screen segment 52B is disabled at block 150, and display segment 46B is switched to module display mode at block 152. If a module is present at port 82C, then touch screen segment 54A is disabled at block 154, and display segment 48A is switched to module display mode at block 156. The routine ends at block 158.

FIG. 12 shows the display 46 in a full screen display mode with no modules in place at ports 82A or 82B. The entire display space is filled with a single continuous graphic display, in this this illustration a lighting patch data base listing. In this mode, the touch screen segments 52A and 52B are enabled and function as single touch screen input area. The user may touch the display 46 at any point and, for example, pull a cursor to the point of touch at an item of the data base listing.

Figure 13:
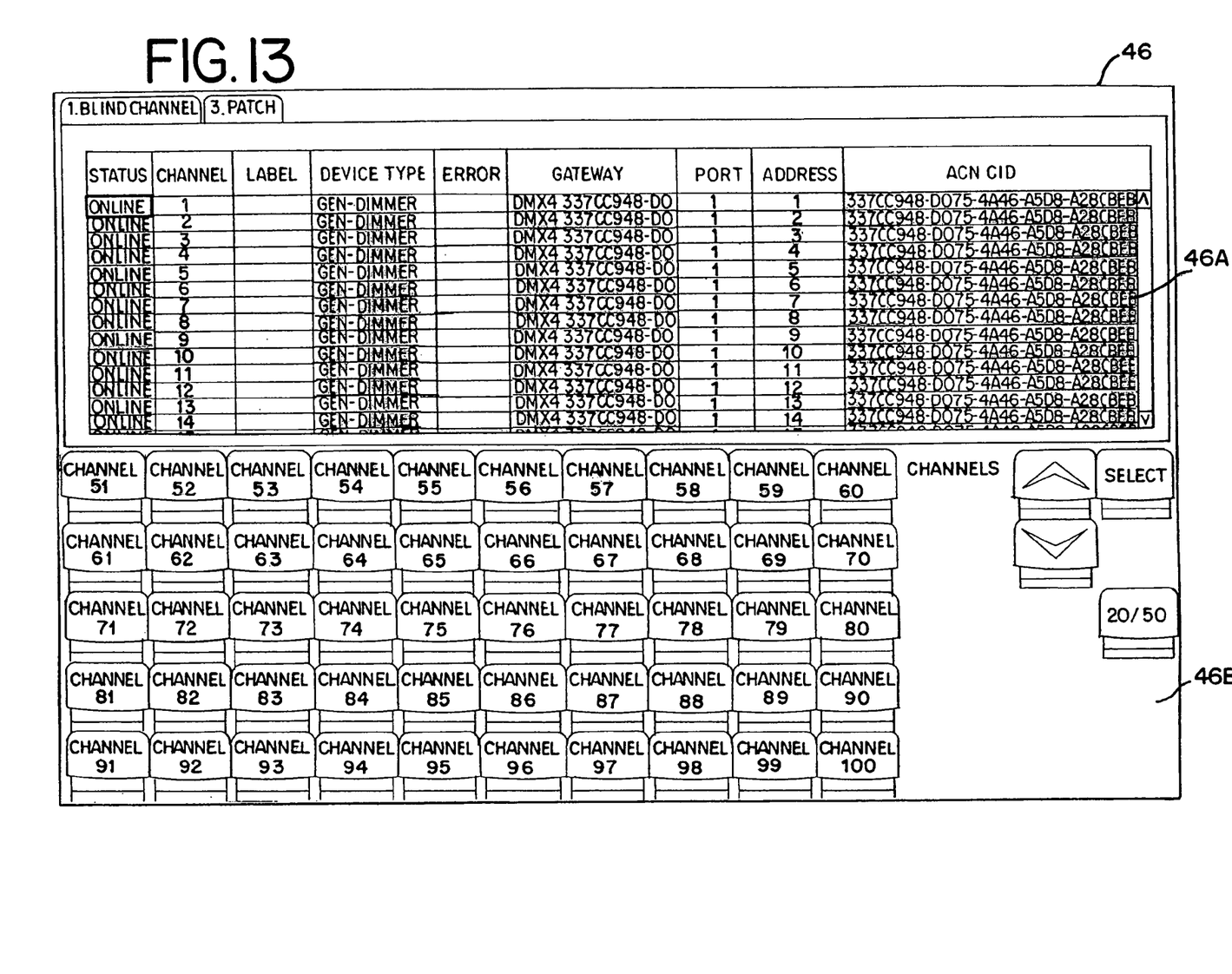
FIG. 13 is a view like FIG. 12 of the display with one module in place on the display.

FIG. 13 shows how the display may be altered when a module 80 is docked at port 82B. The display area 46A continues to display a portion of the same graphic display seen in FIG. 12. However the display segment 46B is switched to a module display mode where appropriate legends are displayed under the legend areas 116 of the buttons 90 of the module. In this condition, as described above, the touch screen segment 52B is disabled while the touch screen segment 52A remains active.

Figure 14:
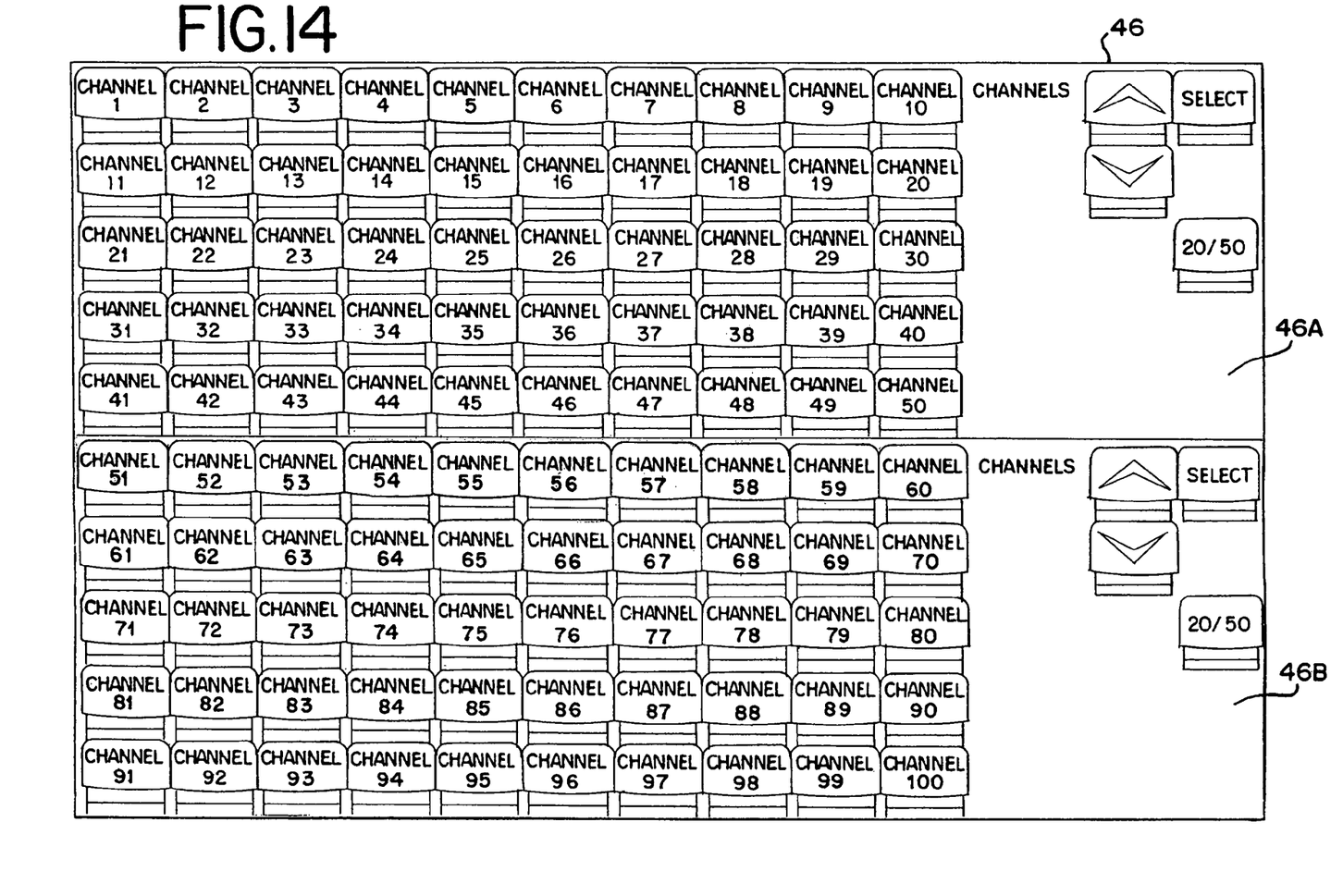
FIG. 14 is a view like FIG. 12 of the display with two modules in place on the display.

FIG. 14 shows how the display is altered when modules are present at both ports 82A and 82B. Both of the display areas 46A and 46B are switched to module mode and each display is independent of the other. Although similar displays are seen in display segments 46A and 46B, the two module display modes can be different, with any desired legends used for the button 90 of each module. In this condition, as described above, both touch screen segments 52A and 52B are disabled.

If desired, printed material or other graphic material may be placed under any module 80 instead of using the corresponding display segment for providing legends for switches 90. If desired the console 20 may have bus ports such as USB ports for connection of other devices such as additional displays, input pointing devices or others.

Figure 16:
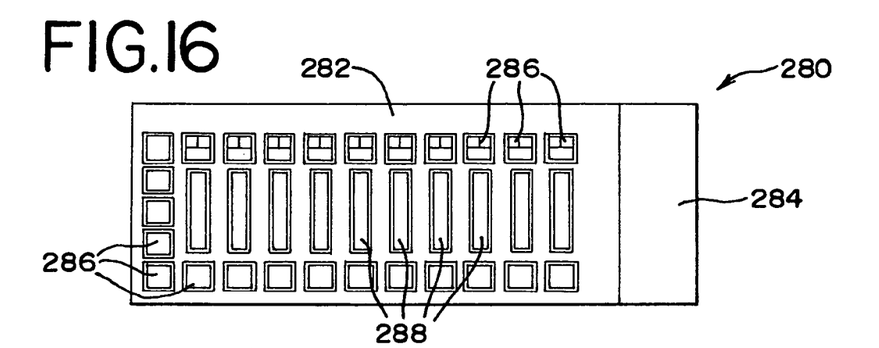
FIGS. 16 and 17 are top plan views of other types of docking modules for the console.

FIG. 16 illustrates a docking module 280 that may be used with the console 20 in place of or in addition to the module 80 described in detail above. Module 280 includes a user input portion 282 and a head portion 284. In many respects the module 280 may be similar to the module 80, and the head portion 284 may include circuitry such as circuitry 94 and a card edge module connector such as the connector 86. The module 282 may be docked at any of the docking ports 82 of the console 20, and interacts with the console 20 in the same manner as the module 80. The module 280 includes a number of push button switches 286 and an array of touch sensitive linear input devices or faders 288. The module 280 is at least partly transparent so that the user is able to view the underlying display through the module. Preferably the push button switches 286 and the faders 288 and/or regions to the sides of the faders 288 are transparent so that information specific to the module 280 and its function can be displayed to assist the user.

Figure 17:
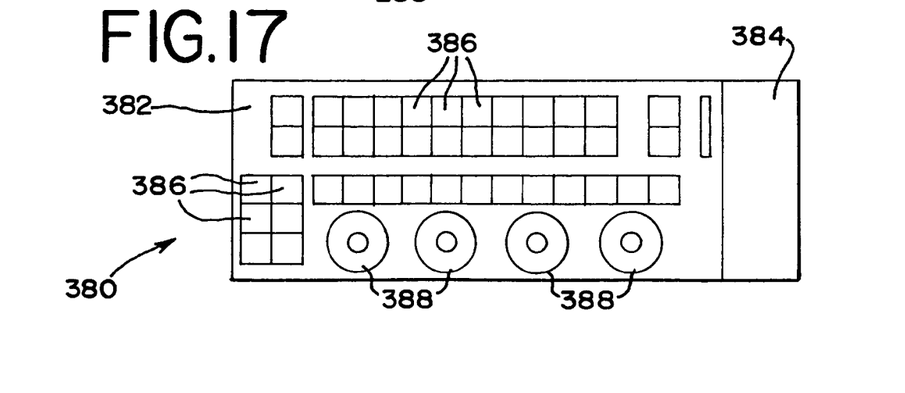

FIG. 17 illustrates a docking module 380 that may be used with the console 20 in place of or in addition to the modules 80 and 280 described above. Module 380 includes a user input portion 382 and a head portion 384. In many respects the module 380 may be similar to the module 80, and the head portion 384 may include circuitry such as circuitry 94 and a card edge module connector such as the connector 86. The module 382 may be docked at any of the docking ports 82 of the console 20, and interacts with the console 20 in the same manner as the modules 80 and 280. The module 380 includes a number of push button switches 386 and an array of rotary input devices or encoders faders 388. The module 380 is at least partly transparent so that the user is able to view the underlying display through the module. Preferably the push button switches 386 are transparent, and encoders 388 may also be transparent, so that information specific to the module 380 and its function can be displayed to assist the user.

While the present invention has been described with reference to the details of the embodiments of the invention shown in the drawing, these details are not intended to limit the scope of the invention as claimed in the appended claims.

What is claimed is:

1. A method of operating a control console comprising:
    displaying information on a console display;
    detecting the presence of a docking module on the console display; and
    changing the information presented on the console display in response to said step of detecting to convey information tailored specifically to user operation of the docking module; wherein
    the docking module is a special purpose input module, and the information tailored specifically to user operation of the special purpose input module comprises legends that are displayed under corresponding legend areas of the special purpose input module when the docking module is docked and overlays the display; and
    the special purpose input module comprises a plurality of push button switches and an array of linear input devices or faders, the method further comprising obtaining independent position information from a plurality of touch screen segments on the display, and discontinuing said obtaining step for any individual touch screen segment when a module is detected on that segment.

2. The method of claim 1 wherein said detecting step includes determining the location of the docking module on the display and said changing step includes displaying the information tailored specifically to user operation of the docking module under the docking module.

3. The method of claim 1 wherein said detecting step includes sensing the presence of a module at a docking port adjacent the display.

4. The method of claim 3 wherein said sensing step includes making electrical contact with a module at the docking port.

5. The method of claim 1, wherein the control console is a lighting control console and the docking module provides lighting console control inputs.

6. The method of claim 1, wherein the special purpose input module further comprises one or more rotary encoders.

7. A method of operating a control console comprising:
obtaining position information from a touch screen covering a console display;
detecting the presence of a docking module that docks to and overlays the console display; and
discontinuing said obtaining step in response to said step of detecting; wherein
said detecting step includes sensing electrical contact with a module at a module docking port adjacent the display; and
said obtaining step includes receiving independent position information from a plurality of touch screen segments on the display, and said discontinuing step includes disabling said receiving step for any individual touch screen segment when a module is detected on that segment.

8. The method of claim 7, wherein the control console is a lighting control console and the docking module provides lighting console control inputs.

9. A control console comprising:
a display;
a plurality of touch screen segments on said display defining a plurality of underlying associated display areas of said display;
a docking port located to the side of each one of said plurality of underlying associated display areas;
a docking module detector; and
a touch screen controller disabling one of said touch screen segments in response to detection of docking of a docking module to the docking port of an underlying associated display area.

10. A control console as claimed in claim 9, further comprising a docking module configured to overlay one of said plurality of touch screen segments when it is docked to the docking port of an underlying associated display area, wherein said docking module is at least partly transparent.

11. A control console as claimed in claim 10 further comprising a console operating system changing the information displayed in an underlying associated display area in response to the detection of docking of said docking module to the docking port of the underlying associated display area.

12. A control console as claimed in claim 11 wherein said docking module includes a plurality of user input elements and transparent legend regions adjacent said elements, said console operating system displaying element legend information in response to the detection of docking of said docking module to the docking port of the underlying associated display area.

13. A control console as claimed in claim 12, said user input elements comprising push button switches.

14. A control console as claimed in claim 12, said user input elements comprising linear faders.

15. A control console as claimed in claim 12, said user input elements comprising rotary encoders.

16. The control console of claim 9, wherein the control console is a lighting control console and the docking module provides lighting console control inputs.

17. A control console comprising:
a display;
an operating system including a display controller for displaying information on said display;
a touch screen assembly overlying said display;
said touch screen assembly including a plurality of touch screen segments;
a touch screen controller continuously connected to each of said segments;
said touch screen controller independently receiving touch position information from each of said touch screen segments; and
a module docking port adjacent one of said touch screen segments, said docking port including a module detector, and said touch screen controller disabling said one touch screen segment in response to a module detection signal from said module detector.

18. The console of claim 17, said touch screen controller including memory for storing touch screen position information for each of said touch screen segments, and a processor for generating overall touch screen position information for a combination of said touch screen segments.

19. The console of claim 18, said touch screen controller communicating to said operating system (i) touch screen position information for each of said touch screen segments, (ii) touch screen position information for less than all of said touch screen segments, or (iii) overall touch screen position information for a combination of said touch screen segments.

20. The console of claim 17, said touch screen assembly including spaced active layers, one of said active layers covering all of said display, and another of said active layers including segment portions defining said display segments.

21. The console of claim 17, said console including module docking ports adjacent said touch screen segments, said module docking ports including module detectors, said touch screen controller disabling said touch screen segments in response to module detection signals from said module detectors.

22. The control console of claim 17, wherein the control console is a lighting control console.

23. A control console as claimed in claim 17, further comprising a module configured to dock to said module docking port, said module comprising a plurality of user input elements comprising push button switches, linear faders, and rotary encoders.

24. A method of controlling a console having a display with a segmented touch screen overlying the display, said method comprising:
obtaining separate touch position information from each segment of the segmented touch screen; and
detecting the presence of a docking module over any one of the touch screen segments and disabling the touch screen segment under the docking module when a docking module is over the touch screen segment.

25. The method of claim 24 further comprising:
using the touch position information from each segment of the segmented touch screen to generate a single overall touch screen position for a combination of the touch screen segments.

26. The method of claim 24 further comprising detecting the presence of docking modules over any of the touch screen segments and disabling the touch screen segment under the docking modules when docking modules are over the touch screen segments.

27. The method of claim 24 further comprising communicating the separate touch screen information to a console operating system and wherein said disabling step includes interrupting the communication of touch screen information from the touch screen segment under the module.

28. The method of claim 24, wherein the control console is a lighting control console and the docking module provides lighting console control inputs.

* * * * *